US012663180B2

(12) United States Patent
Berchtold et al.

(10) Patent No.: US 12,663,180 B2
(45) Date of Patent: Jun. 23, 2026

(54) HEATING DEVICE AND METHOD OF MANUFACTURING A HEATING DEVICE

(71) Applicant: Faurecia Emissions Control Technologies, Germany GmbH, Augsburg (DE)

(72) Inventors: Anton Berchtold, Augsburg (DE); David Saurat, Augsburg (DE)

(73) Assignee: FAURECIA EMISSIONS CONTROL TECHNOLOGIES, GERMANY GMBH, Augsburg (DE)

( * ) Notice: Subject to any disclaimer, the term of this patent is extended or adjusted under 35 U.S.C. 154(b) by 1066 days.

(21) Appl. No.: 17/751,834

(22) Filed: May 24, 2022

(65) Prior Publication Data

US 2022/0381477 A1      Dec. 1, 2022

(30) Foreign Application Priority Data

May 27, 2021    (DE) ..................... 10 2021 113 760.8

(51) Int. Cl.
*F24H 3/00*          (2022.01)
*B01D 53/94*         (2006.01)
(Continued)

(52) U.S. Cl.
CPC ............. *F24H 3/002* (2013.01); *B01D 53/94* (2013.01); *H05B 3/12* (2013.01); *F01N 3/2013* (2013.01);
(Continued)

(58) Field of Classification Search
CPC ........... F24H 3/002; B01D 53/94; H05B 3/12; H05B 2203/007; H05B 2203/016;
(Continued)

(56) References Cited

U.S. PATENT DOCUMENTS 5,433,926 A * 7/1995 Swars ................... F01N 13/009
                                                                  422/174
5,526,462 A * 6/1996 Kondo .................. F01N 3/2814
                                                                  219/536
(Continued)

FOREIGN PATENT DOCUMENTS

CN        112832887 A      5/2021
DE    102020130657 A1      5/2021
(Continued)

OTHER PUBLICATIONS

German Search Report for Application No. 10 2021 113 760.8 dated Jun. 30, 2022.

*Primary Examiner* — Elizabeth M Kerr
*Assistant Examiner* — Keith Brian Assante
(74) *Attorney, Agent, or Firm* — Carlson, Gaskey & Olds, P.C.

(57) ABSTRACT

A heating device, and a method of manufacturing the device, comprises an electrically conductive heating foam, a current conducting foam and two electrodes. The heating foam is divided by interruptions into sections, providing a pre-defined current path extending from a current lead-in point to a current lead-out point. The electrodes are electrically connected to the current lead-in and lead-out points, respectively, wherein the heating foam is provided on an outside at least in sections with the current conducting foam forming current conducting sections that electrically connect sections of the heating foam to one another. The current lead-in or lead-out point is provided as a connection section of the current conducting foam and extends in a circumferential direction along at least one current conducting section, but is electrically insulated therefrom. The two electrodes are spaced apart from one another in the circumferential direction by less than 180 degrees.

12 Claims, 6 Drawing Sheets

(51) Int. Cl.
  *F01N 3/20*               (2006.01)
  *H05B 3/12*               (2006.01)
(52) U.S. Cl.
  CPC .. *H05B 2203/007* (2013.01); *H05B 2203/016*
    (2013.01); *H05B 2203/022* (2013.01)
(58) Field of Classification Search
  CPC ........ H05B 2203/022; H05B 2203/017; H05B
    2203/024; H05B 3/24; F01N 3/2013;
    F01N 3/2006; F01N 2240/16; Y02A
                                                    50/20
  See application file for complete search history.

(56)                References Cited

U.S. PATENT DOCUMENTS

| | | | | |
|---|---|---|---|---|
| 5,533,167 | A * | 7/1996 | Kondo | F01N 3/0807 |
| | | | | 422/174 |
| 5,597,503 | A * | 1/1997 | Anderson | F01N 3/2026 |
| | | | | 422/174 |
| 5,655,211 | A * | 8/1997 | Maus | B01J 35/57 |
| | | | | 428/548 |
| 5,695,722 | A * | 12/1997 | Myers | H05B 3/10 |
| | | | | 422/174 |

| | | | | |
|---|---|---|---|---|
| 6,423,276 | B1 | 7/2002 | Abe | |
| 8,158,908 | B2 | 4/2012 | Konieczny et al. | |
| 8,668,876 | B2 | 3/2014 | Bruck et al. | |
| 11,480,086 | B2 | 10/2022 | Richard et al. | |
| 11,713,701 | B2 | 8/2023 | Feng et al. | |
| 11,840,950 | B2 | 12/2023 | Ottaviani et al. | |
| 11,867,105 | B2 * | 1/2024 | Fonte | F01N 3/027 |
| 2010/0319314 | A1 * | 12/2010 | Noller | F01N 3/2839 |
| | | | | 60/272 |
| 2012/0097659 | A1 | 4/2012 | Duesterdek et al. | |
| 2013/0199165 | A1 * | 8/2013 | Kawase | F01N 3/2013 |
| | | | | 60/300 |
| 2021/0156290 | A1 * | 5/2021 | Feng | F01N 3/2026 |
| 2021/0301767 | A1 | 9/2021 | Feng et al. | |
| 2021/0404363 | A1 * | 12/2021 | Richard | F01N 3/2026 |
| 2022/0220876 | A1 * | 7/2022 | Ottaviani | F01N 3/0275 |

FOREIGN PATENT DOCUMENTS

| | | |
|---|---|---|
| DE | 102021107738 A1 | 9/2021 |
| DE | 102021116509 A1 | 12/2021 |
| EP | 0755171 B1 | 10/2002 |
| FR | 3096075 A1 | 11/2020 |
| FR | 3103517 A1 | 5/2021 |
| FR | 3111944 A1 | 12/2021 |

* cited by examiner

1

32

30

10

20

1

22   22   40

32   30

22

26

16

12

28

10

12

27

22

20

22

24

14

29

12

12

25

22

HEATING DEVICE AND METHOD OF MANUFACTURING A HEATING DEVICE

CROSS-REFERENCE TO RELATED APPLICATIONS

This application is a U.S. non-provisional application claiming the benefit of German Application No. 10 2021 113 760.8, filed on May 27, 2021, which is incorporated herein by reference in its entirety.

TECHNICAL FIELD

The disclosure relates to a heating device for an exhaust system and a method of manufacturing such a heating device.

BACKGROUND

Exhaust systems of internal combustion engines usually have catalytic converters provided therein in order to reduce emissions.

For the catalytic converter to light off quickly after a cold start of the internal combustion engine, it is known to provide heating devices that heat the catalytic converter to a reaction temperature.

The heating device may be provided in the form of a heating device through which exhaust gas flows and which is arranged upstream of the catalytic converter and configured to heat the exhaust gas before it flows through the catalytic converter.

In this context, it is already known to provide heating elements (e.g. heating grids, heating filaments or heating foams) for heating within the heating device. These heating elements are electric resistance heaters to which a heating current is applied by two electrodes.

In one known embodiment of the heating foam, it has a snakelike shape in cross-section, in which the electrodes are attached to the ends of the snakelike form. This embodiment allows a particularly homogeneous temperature distribution to be achieved over the cross-section through which the flow passes, which in turn is important for high efficiency of the catalytic converter.

In order for a homogeneous temperature distribution to be achieved, the heating foam extends in the heating device evenly and symmetrically so that the ends of the snake-shaped heating foam are at least almost opposite each other. For this reason, the electrodes have to be arranged at an angle of almost 180 degrees, but at an angle of 120 degrees at a minimum, relative to each other. Merely by way of example, U.S. Pat. No. 5,695,722 A1 is mentioned here.

However, for integrating such heating devices into a superordinate system, installation angles of less than 120 degrees are called for in most cases.

SUMMARY

The disclosure provides a heating device for an exhaust system of a motor vehicle in which two electrodes can be arranged at an angular distance of less than 120 degrees, and which includes an electrically conductive heating foam that is divided by interruptions into sections which, viewed in a cross-section, are located side by side such that a predefined current path is provided that extends from a current lead-in point of the heating device to a current lead-out point, for example from one side of the heating device to the other side. Two electrodes are provided which are electrically connected to the current lead-in point and the current lead-out point, respectively. The heating foam is provided on an outside, at least in sections, with a current conducting foam that forms current conducting sections which electrically connect sections of the heating foam to one another. The current lead-in point or the current lead-out point is provided as a connection section which is comprised of the current conducting foam, and which extends in the circumferential direction along at least one current conducting section, but is electrically insulated therefrom. The connection section is electrically connected to one of the sections of the heating foam and to one of the electrodes, so that the two electrodes are spaced apart from one another in the circumferential direction by less than 180 degrees, in particular less than 120 degrees, and wherein the current lead-in point or current lead-out point not yet assigned is provided as a second connection section which is comprised of the current conducting foam and is connected to the other of the two electrodes. The disclosure is based on the fundamental idea of providing, via the current conducting foam that is present anyway, a contacting section for an electrode which extends along the heating foam such that the electrode can be placed at the desired position.

The current conducting foam used in addition to the heating foam allows the electrodes to be reliably attached to the firmer current conducting foam. Furthermore, the current conducting sections may be made thin, since the critical boundary cross-sectional area at which hotspot formation just does not yet occur is lower as a result of the densification than with an undensified foam.

Here, the connected sections of the heating foam may constitute the predefined current path of the heating foam, wherein the connection section electrically connected to a first electrode is contacted to one of the outer ends of the current path within the heating foam, and the second connection section electrically connected to the second electrode is contacted to the second outer end of the current path within the heating foam. By maximizing the current path length within the heating foam, a particularly homogeneous heating of the exhaust gas stream is achieved and the heating surface is increased, which enables the catalytic converter to operate even more efficiently.

According to one embodiment, the second connection section, like the first connection section, extends in the circumferential direction along at least one current conducting section, but is electrically insulated therefrom. By arranging the second connection section also along a current conducting section, a symmetrical embodiment can be designed in which the two connection sections are of equal length, thereby producing a symmetrical current injection and current discharge.

According to one configuration of the disclosure, it is provided that the current conducting foam has a hollow-cylindrical, in particular annular, shape and does not have any structures projecting from the outer or inner surfaces of the shape, wherein the at least one electrical insulation between a connection section and a current conducting section may be effected by recesses within the hollow-cylindrical, in particular annular, shape. The design configuration with no projecting structures keeps the manufacturing and assembly expenditure low. In addition, this embodiment is particularly compact.

Advantageously, the current conducting foam has the shape of a hollow circular cylinder, and the connection sections and the current conducting sections do not protrude below or above the inside diameter or the outside diameter of the current conducting foam, respectively. The hollow circular-cylindrical shape involves an even lower manufacturing expenditure and allows a simple installation of the heating device into a superordinate assembly, for example a housing, the geometry of which can also be designed with a hollow circular-cylindrical shape for accommodation, thus additionally reducing the overall manufacturing expenditure.

According to a further embodiment, the current conducting foam has the basic shape of a hollow circular cylinder, and at least one connection section or one current conducting section is located outside or inside the basic shape and protrudes above or below the outside or inside diameter of the basic shape, respectively. This embodiment allows material and space savings to be achieved, while at the same time providing connection sections and/or current conducting sections of reinforced design in their overlap regions, which prevent hotspot formation.

The above-mentioned object is further achieved by a method of manufacturing a heating device of the type mentioned at the outset, the manufacturing method including the steps of:

(a) manufacturing a heating foam and shaping the outer contour of the heating foam;

(b) manufacturing an outer current conducting foam and shaping the inner contour of the current conducting foam;

(c) inserting the heating foam into the current conducting foam;

(d) connecting the heating foam with the current conducting foam in an oven; and (e) generating a snake-shaped current path and forming the connection sections and current conducting sections in the current conducting foam by incising the heating foam and the current conducting foam.

The special advantage of this method is that the connection sections and the current conducting sections are not formed until the heating foam and the current conducting section are incised after the heating foam has been connected to the current conducting foam. As a result, it is not necessary to work with a multitude of individual components at any time, and it is not necessary to mount many individual components to each other.

According to one variant, manufacturing the outer current conducting foam comprises a pre-densification of the foam-like starting material. Pre-densification of the current conducting foam allows the same starting material to be used for the heating foam and the current conducting foam, thereby simplifying material purchasing and reducing storage costs.

BRIEF DESCRIPTION OF THE DRAWINGS

The disclosure will be discussed below with reference to various exemplary embodiments, which are shown in the accompanying drawings, in which.

DETAILED DESCRIPTION

Figure 1:
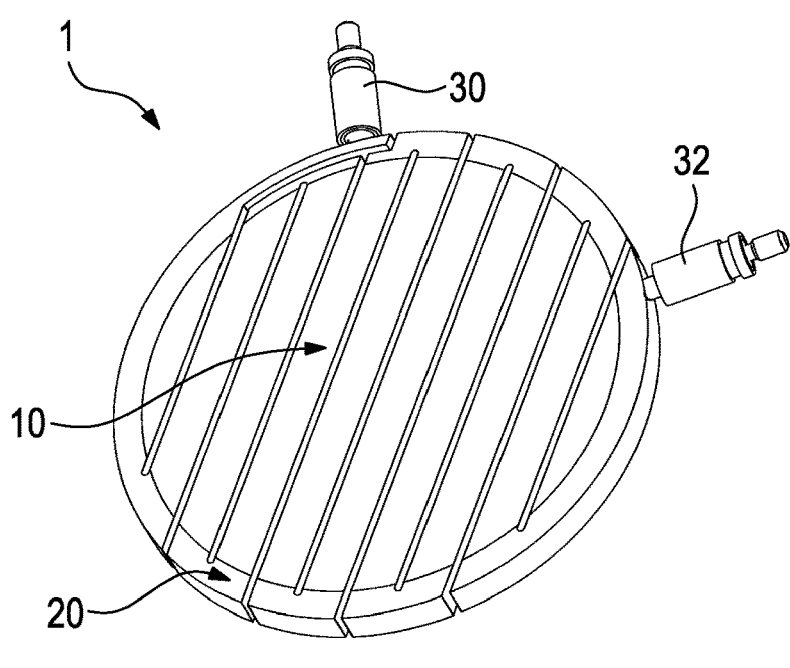
FIG. 1 shows a perspective view of a heating device according to a first embodiment of the disclosure, which was manufactured by a method according to the disclosure.
Figure 2:
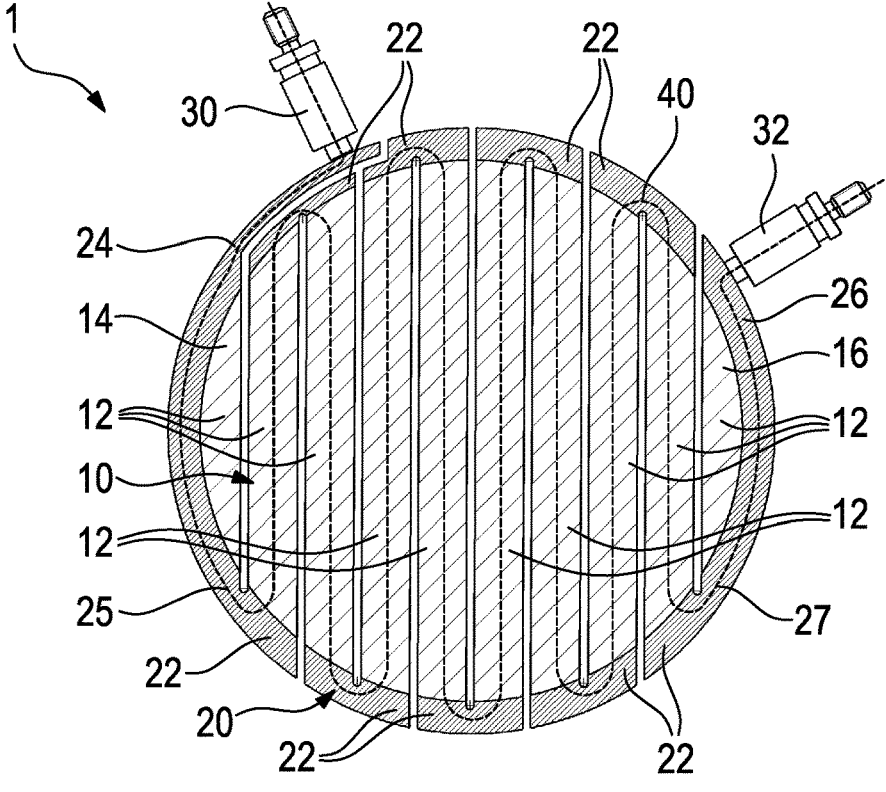
FIG. 2 shows a cross-section of the heating device of FIG. 1, with the electrodes not being illustrated in section.

FIGS. 1 and 2 show a heating device 1 that is used to heat the exhaust gas flow of an internal combustion engine.

The heating device 1 comprises a heating foam 10, a current conducting foam 20, a first electrode 30, and a second electrode 32. The current conducting foam 20 is connected to the heating foam 10 and surrounds the heating foam 10. The two electrodes 30, 32 are attached to first and second connection sections 24, 26, respectively, on the outer circumference of the current conducting foam 20.

The heating foam 10 comprises a plurality of sections 12, which are formed by incisions in the heating foam 10.

These sections 12 have the function of heating the exhaust gas stream flowing through the heating device 1.

The current conducting foam 20 has two functions: Firstly, it is mechanically and electrically connected to the electrodes 30, 32 via which the heating current is led in. Owing to its mechanically higher strength, the current conducting foam 20 is well suited for this purpose, without the need to provide contact sheets, etc.. Secondly, the current conducting foam 20 serves to electrically connect the individual sections 12 of the heating foam 10 to each other. The current conducting foam 20 forms a respective current conducting section 22 between the individual sections 12, so that altogether a predefined current path 40 (illustrated in dashed lines) through the heating device 1 is produced, which extends from one electrode 30, 32 to the other.

The current conducting foam 20 differs from the heating foam 10 in that the starting material of the current conducting foam 20 has been predensified. Due to its higher density, the current conducting foam 20 has a lower electrical resistivity, so that no heat is generated in the current conducting foam 20 (or at least not to any appreciable extent). In addition, the lower resistivity ensures that no hot spots will occur in the current conducting sections 22.

Basically, it is possible to provide the current conducting foam 20 with a higher current conductivity by other ways than by way of a higher density.

The current path 40 extends from the first electrode 30 through the first connection section 24, the first section 14 of the heating foam 10, the current conducting sections 22 and the further sections 12 of the heating foam 10 up to the last section 16 of the heating foam 10 and the second connection section 26 to the second electrode 32. The current path shows which sections 12 of the heating foam 10 are potentially heatable.

In the first embodiment according to FIGS. 1 and 2, the first connection section 24 and the second connection section 26 are electrically conductively connected to the first current conducting section 25 and the last current conducting section 27, respectively. Since the current chooses the path of least resistance, in this configuration the first and last sections 14, 16 of the heating foam 10 are bypassed and not heated. Bypassing the sections 14, 16 reduces the inert mass to be heated of the heating foam 10 and results in accelerated heating of the remaining sections with the heating power being the same.

The special configuration and arrangement of the connection sections 24, 26 makes it possible to position the electrodes 30, 32 on the outer circumference of the current conducting foam 20 at an angle of less than 120 degrees to one another.

According to FIG. 2, the first connection section 24 extends on the outside of the current conducting foam 20 along two current conducting sections 22. The connection section 24 is electrically insulated from the current conducting sections 22.

In this embodiment, the second connection section 26 is arranged in accordance with a manner known from the prior art, in which the connection section 26 does not extend along at least one current conducting section 22, but is arranged in the circumferential direction next to the current conducting sections 22. Due to the two different connection sections 24, 26, an asymmetrical arrangement is obtained in this embodiment.

The current conducting foam 20 may assume various design forms. The first embodiment according to FIGS. 1 and 2 has a current conducting foam 20 having a hollow circular cylindrical shape, in which the insulation between the current conducting sections 22 and the connection sections 24, 26 is implemented by recesses, here in the form of slits.

Figure 3:
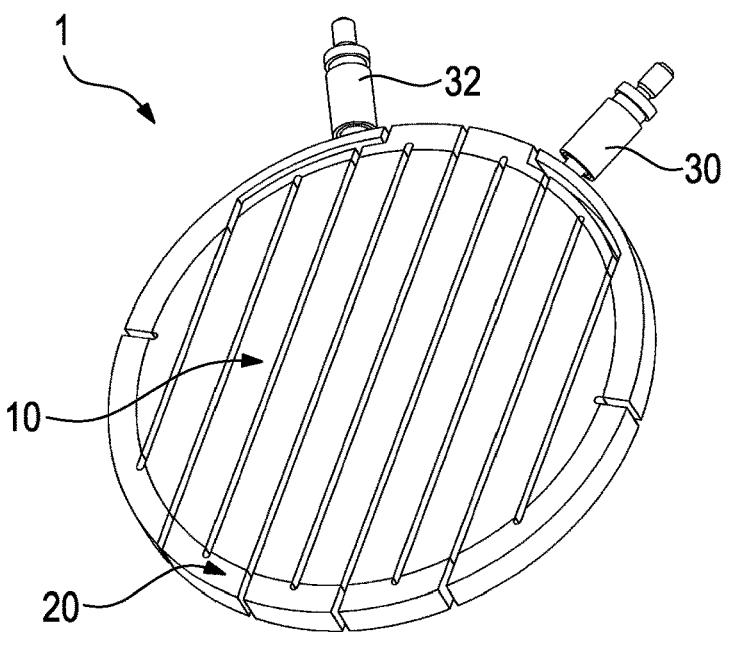
FIG. 3 shows a perspective view of a heating device according to a second embodiment of the disclosure, which was manufactured by a method according to the disclosure.
Figure 4:
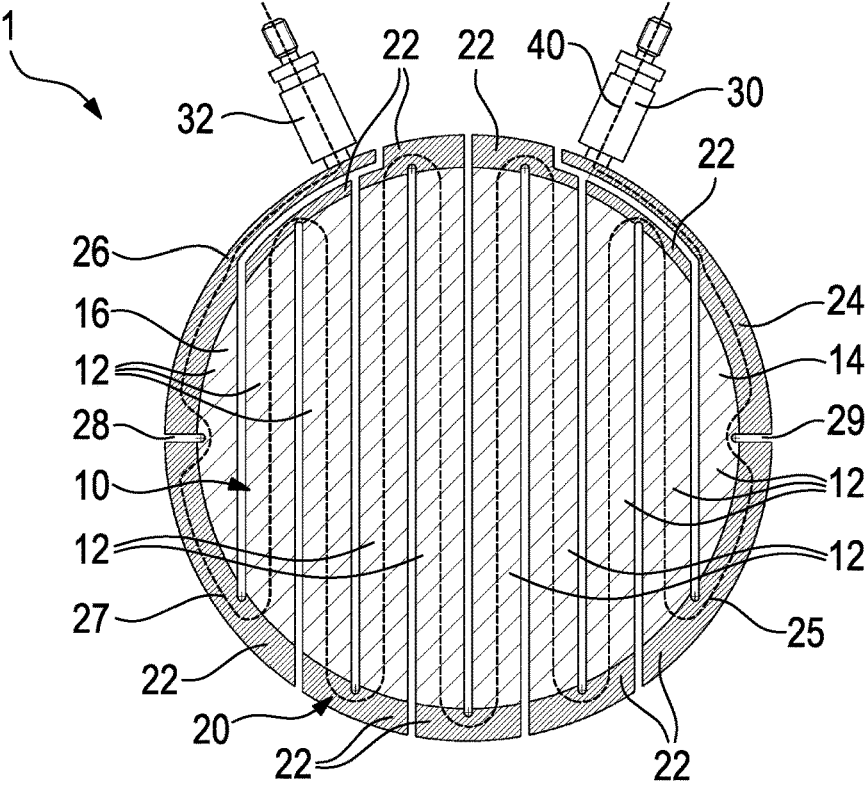
FIG. 4 shows a cross-section of the heating device of FIG. 3, with the electrodes not being illustrated in section.

FIGS. 3 and 4 show a heating device 1 according to a second embodiment. The same reference numbers are used for the components and features known from the first embodiment, and reference is made to the above discussion.

One difference between the first embodiment and the second embodiment is that in the second embodiment the connection sections 24, 26 are made symmetrical and each of them extends on the outside of the current conducting foam 20 along two current conducting sections 22.

A further difference from the first embodiment resides in the additionally provided electrical separations 28, 29, here in the form of slots, between the connection sections 24, 26 and the first and last current conducting sections 25, 27, respectively. These separations 28, 29 prevent a bridging across the current conducting foam 20. However, the separations 28, 29 shown are to be understood as examples only and may also be larger and positioned at a different point, in particular in order to maximize the length of the current path 40.

Like the first embodiment, the second embodiment according to FIGS. 3 and 4 also has a current conducting foam 20 of a hollow circular cylindrical shape, in which the insulation between the current conducting sections 22 and the connection sections 24, 26 is implemented by recesses, here also in the form of slots.

Figure 5:
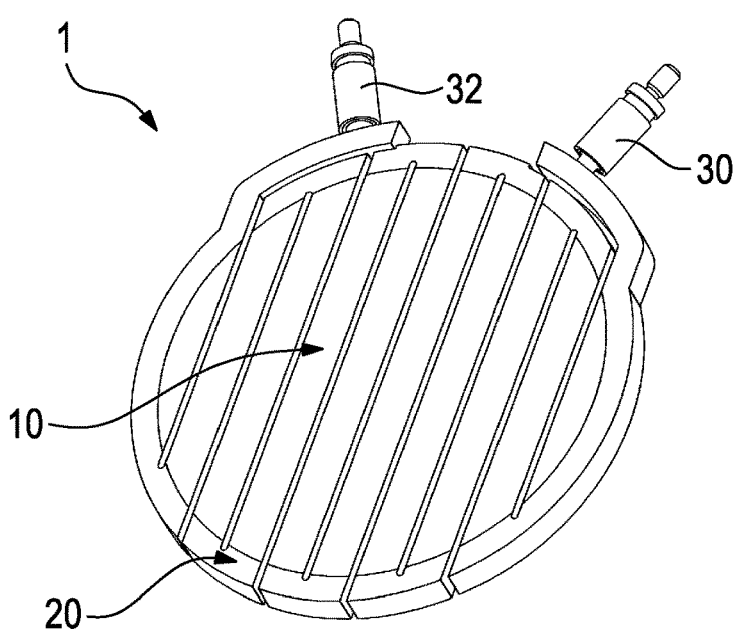
FIG. 5 shows a perspective view of a heating device according to a third embodiment of the disclosure, which was manufactured by a method according to the disclosure.
Figure 6:
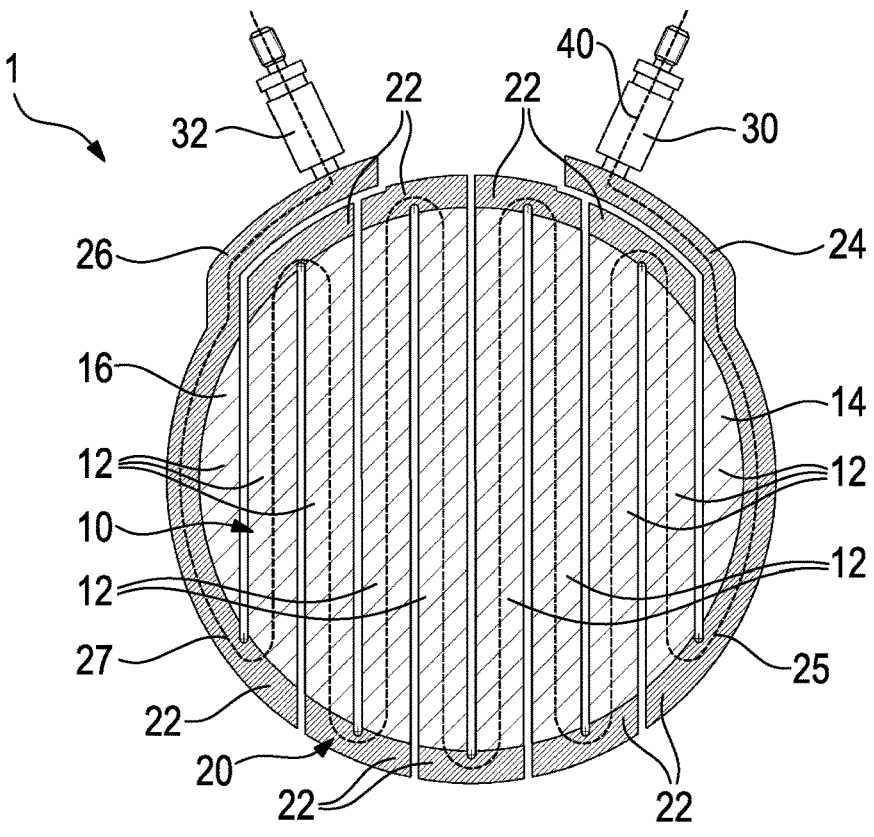
FIG. 6 shows a cross-section of the heating device of FIG. 5, with the electrodes not being illustrated in section.

FIGS. 5 and 6 show a heating device 1 according to a third embodiment. The same reference numbers are used for the components and features known from the preceding embodiments, and reference is made to the above discussions.

The difference between the third embodiment and the first and second embodiments is in that in the third embodiment the current conducting foam 20 has a hollow circular cylindrical basic shape in which the two connection sections 24, 26 protrude beyond the outside diameter of the basic shape. Here, in order to avoid hot spots while at the same time saving as much material as possible, the connection sections 24, 26 and the current conducting sections 22 have similarly large dimensions. This means that for any sectional plane where the current path 40 is normal to this sectional plane, the cross-sectional areas of the connection sections 24, 26 and the current conducting sections 22 are of similar size.

Figure 7:
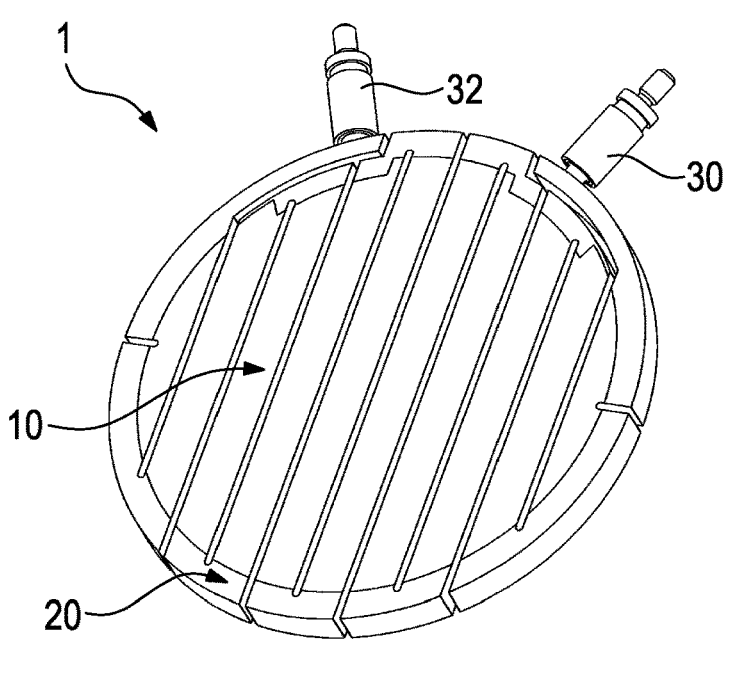
FIG. 7 shows a perspective view of a heating device according to a fourth embodiment of the disclosure, which was manufactured by a method according to the disclosure.
Figure 8:
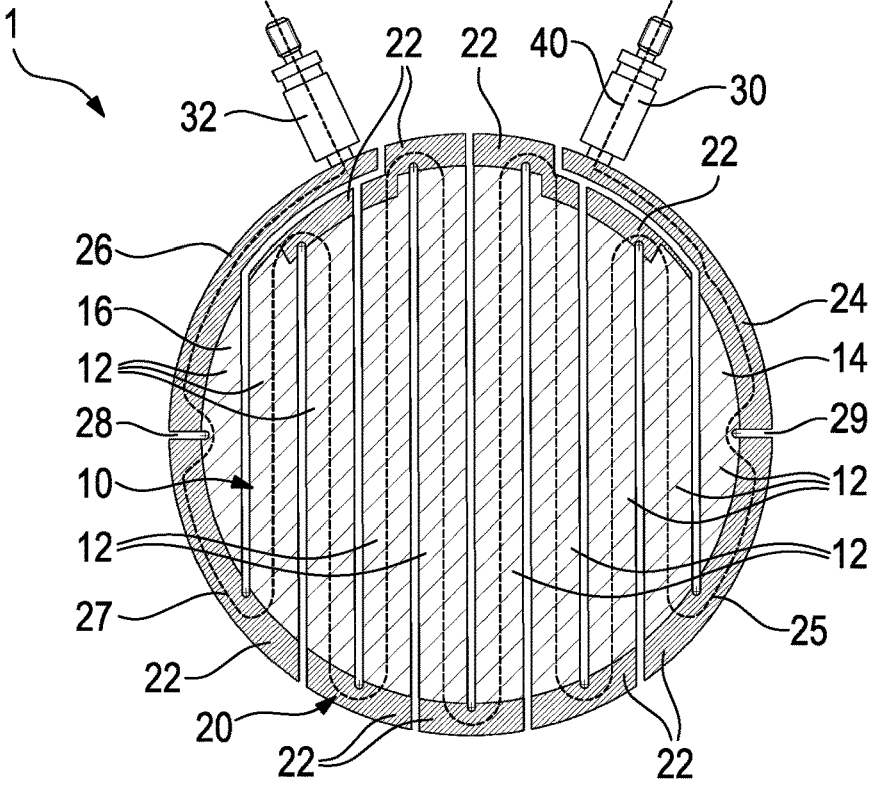
FIG. 8 shows a cross-section of the heating device of FIG. 7, with the electrodes not being illustrated in section.

FIGS. 7 and 8 show a heating device 1 according to a fourth embodiment. The same reference numbers are used for the components and features known from the preceding embodiments, and reference is made to the above discussions.

As in the third embodiment, in the fourth embodiment the current conducting foam 20 has a hollow circular cylindrical basic shape. The difference between the fourth and third embodiments is that the two connection sections 24, 26 project below the inside diameter of the basic shape. Here, as in the third embodiment, the connection sections 24, 26 and current conducting sections 22 have dimensions of similar size; in addition, the cylindrical outer shape of the heating device 1 allows it to be easily integrated into a superordinate assembly (e.g., a housing).

As in the second embodiment, in the fourth embodiment electrical separations 28, 29, here also in the form of slots, are provided between the connection sections 24, 26 and the first and last current conducting sections 25, 27, respectively. The current path 40 is thereby conducted through the first and last sections 14, 16 of the heating foam 10, as a result of which these can also be heated.

Two further, particularly advantageous embodiments can be seen from FIGS. 9 to 12. These embodiments essentially correspond to the second embodiment but, unlike the latter, have specially shaped separations 28, 29 to allow even more uniform heating in the edge portions by an improved current flow in the first and last sections 14, 16 of the heating foam 10.

Figure 9:
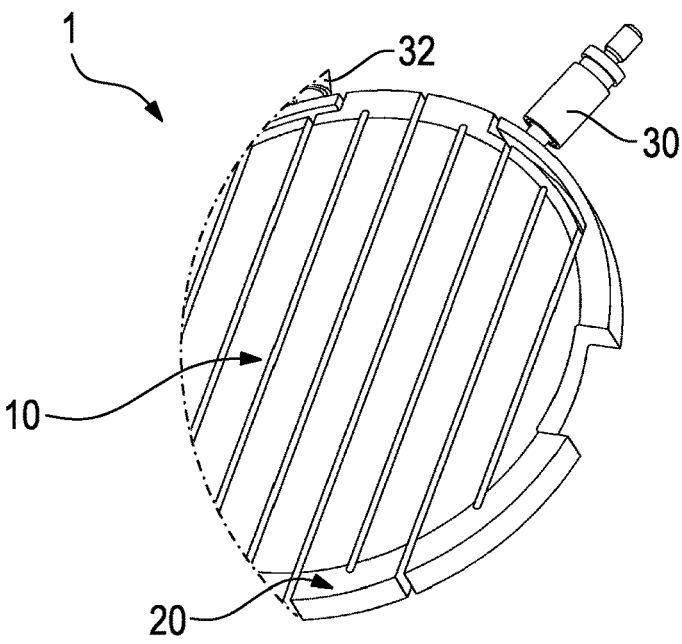
FIG. 9 shows a perspective view of a detail of a heating device according to a fifth embodiment of the disclosure, which was manufactured by a method according to the disclosure.
Figure 10:
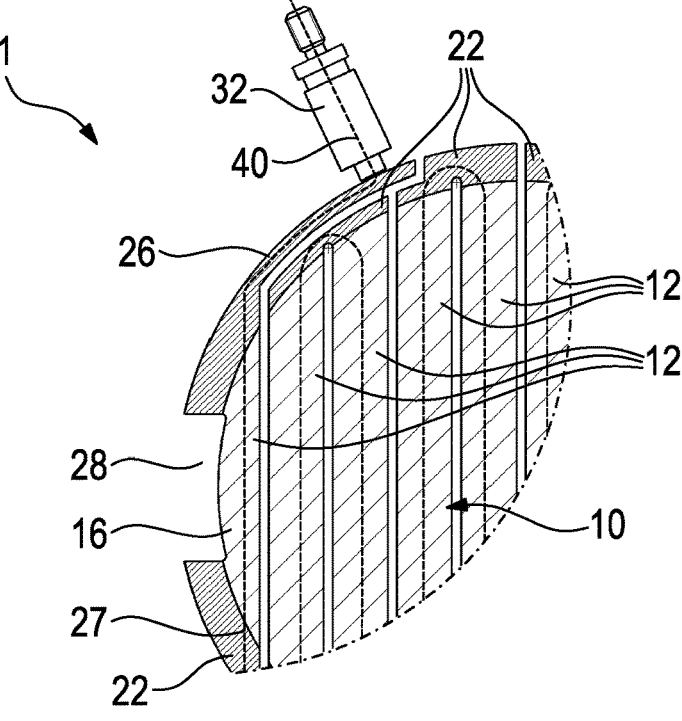
FIG. 10 shows a cross-section of the detail of the heating device of FIG. 9, with the electrodes not being illustrated in section.

For this purpose, in the fifth embodiment according to FIGS. 9 and 10, the separations 28, 29 are made larger in the circumferential direction, with the result that the connection section 24 and the current conducting section 25 and also the connection section 26 and the current conducting section 27 are spaced further apart from one another than in the second embodiment, for example.

Figure 11:
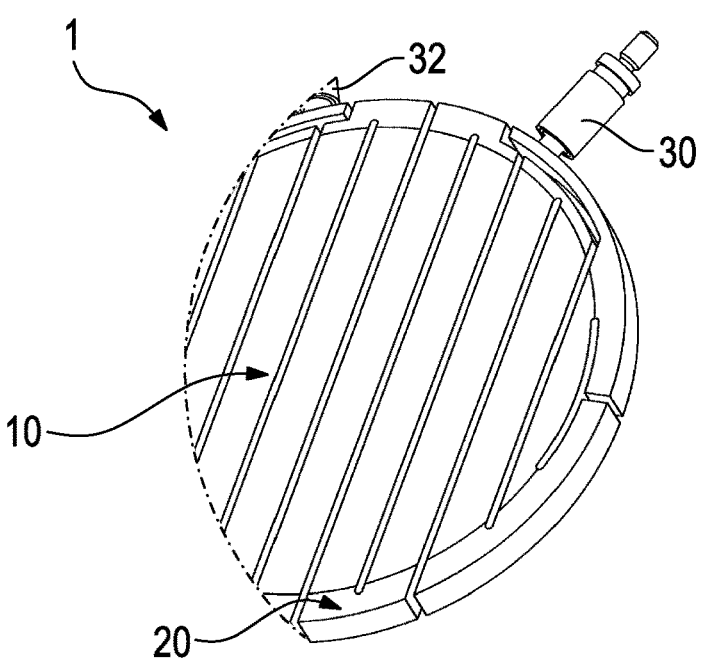
FIG. 11 shows a perspective view of a detail of a heating device according to a sixth embodiment of the disclosure, which was manufactured by a method according to the disclosure.
Figure 12:
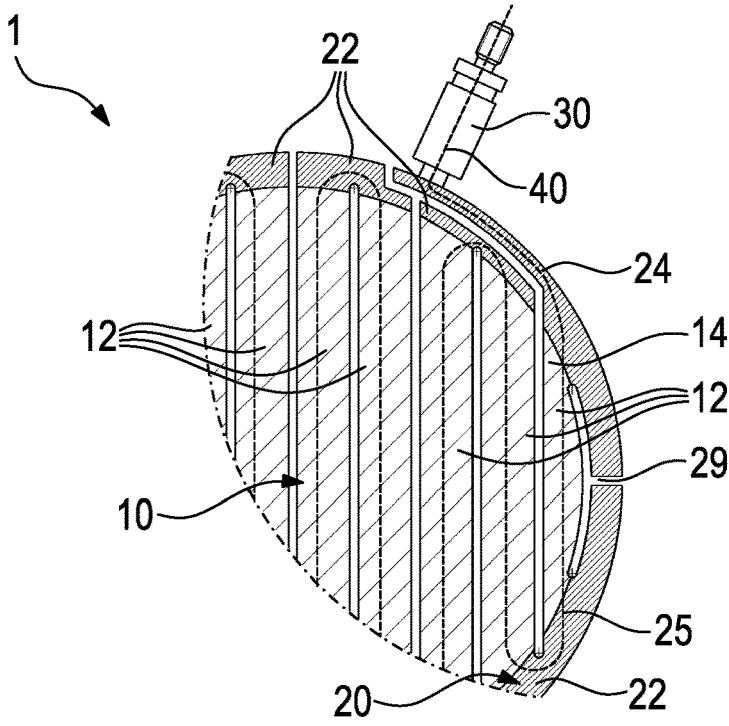
FIG. 12 shows a cross-section of the detail of the heating device of FIG. 11, with the electrodes not being illustrated in section.

The sixth embodiment according to FIGS. 11 and 12 includes T-shaped separations 28, 29. In a direct comparison with the second embodiment, the separations 28, 29 are likewise constituted by a slot that extends radially through the current conducting foam 20, but this slot splits into two further, adjoining slots in the form of branches that extend in the circumferential direction between the current conducting foam 20 and the heating foam 10. The current conducting foam 20 thus continues to remain largely round in cross-section, which simplifies the geometry of a housing in which the current conducting foam can be supported, and thus facilitates standardization.

Of course, combinations of the embodiments shown are also conceivable. Likewise, the current conducting foam 20 may have any desired hollow cylindrical, in particular annular, shape.

The manufacture of a heating device 1 will now be described below.

To this end, the starting material of the heating foam 10 is manufactured and the outer contour thereof is shaped. The outer contour of the heating foam 10 can be freely selected, but it has to substantially correspond to the inner contour of the current conducting foam 20 described below.

In a further step, which may be performed before, after or during the previous step, the starting material of the current conducting foam 20 is manufactured and the inner contour thereof is shaped. Thus, by shaping the inner contour of the current conducting foam 20, the counter piece to the heating foam 10 is formed.

Subsequently, the heating foam 10 is inserted into the current conducting foam 20. This may require a joining force if the outer contour of the heating foam 10 has an oversize relative to the inner contour of the current conducting foam 20.

The heating foam 10 is then connected to the current conducting foam 20 in an oven. In particular, sintering processes are especially well suited for permanently connecting the two foam-like components with each other.

In a downstream step, the snake-shaped current path 40 is produced by forming the connection sections 24, 26 and the current conducting sections 22 in the current conducting foam 20 by incisions in the heating foam 10 and the current conducting foam 20. Cutting into the heating foam 10 and the current conducting foam 20 is deliberately effected only after the two components have been connected in the oven, thereby avoiding having a large number of individual parts which would otherwise have to be brought into position during downstream joining. As a result, this method offers particularly simple handling of all the components involved.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A heating device for an exhaust system of a motor vehicle, comprising:

an electrically conductive heating foam that is divided by interruptions into sections which, viewed in a cross-section, are located side by side to provide a predefined current path that extends from a current lead-in point at one side of the heating device to a current lead-out point at another side of the heating device;

two electrodes which are electrically connected to the current lead-in point and the current lead-out point, respectively, wherein the electrically conductive heating foam is provided on an outside, at least in sections, with a current conducting foam that forms current conducting sections which electrically connect adjacent sections of the electrically conductive heating foam to one another; and wherein the current lead-in point or the current lead-out point is provided as a first connection section comprised of the current conducting foam and which extends in a circumferential direction along at least one current conducting section, but is electrically insulated therefrom, wherein the first connection section is electrically connected to one of the sections of the electrically conductive heating foam and to one of the two electrodes, so that the two electrodes are spaced apart from one another in the circumferential direction by less than 180 degrees, and wherein the current lead-in point or current lead-out point not yet assigned is provided as a second connection section comprised of the current conducting foam and which is connected to the other of the two electrodes.

2. The heating device according to claim 1, wherein connected sections of the electrically conductive heating foam constitute the predefined current path of the electrically conductive heating foam, wherein the first connection section electrically connected to the one of the two electrodes is contacted to a first outer end of the predefined current path within the electrically conductive heating foam, and the second connection section electrically connected to the other of the two electrodes is contacted to a second outer end of the predefined current path within the electrically conductive heating foam.

3. The heating device according to claim 1, wherein the second connection section, like the first connection section, extends in the circumferential direction along at least one current conducting section, but is electrically insulated therefrom.

4. The heating device according to claim 1, wherein the current conducting foam has a hollow-cylindrical shape and the current conducting foam does not have any structures projecting from outer or inner surfaces of the hollow-cylindrical shape, and wherein at least one electrical insulation between the first and/or second connection section and the at least one current conducting section is created by recesses within the hollow-cylindrical shape.

5. The heating device according to claim 4, wherein the current conducting foam comprises a hollow circular cylinder and the first and second connection sections and associated current conducting sections do not protrude below or above an inside diameter or an outside diameter of the current conducting foam, respectively.

6. The heating device according to claim 1, wherein the current conducting foam has a basic shape of a hollow circular cylinder and at least one of the first or second connection section or one current conducting section is located outside or inside the basic shape and protrudes above or below an outside or inside diameter of the basic shape, respectively.

7. The heating device according to claim 1, wherein the current conducting foam has a higher density than the electrically conductive heating foam.

8. The heating device according to claim 1, wherein the two electrodes are spaced apart from one another in the circumferential direction by less than 120 degrees.

9. The heating device according to claim 4, wherein the current conducting foam has an annular shape.

10. The heating device according to claim 1, wherein the current conducting foam is connected to the electrically conductive heating foam and surrounds the electrically conductive heating foam.

11. The heating device according to claim 1, wherein the two electrodes comprise a first electrode connected to the first connection section and a second electrode connected to the second connection section.

12. The heating device according to claim 11, wherein the predefined current path extends from the first electrode circumferentially through the first connection section, then through a first section of the electrically conductive heating foam, then through the current conducting sections and additional sections of the electrically conductive heating foam up to a last section of the electrically conductive heating foam, and then circumferentially through the second connection section to the second electrode.

* * * * *